US012589760B2

(12) United States Patent
Zhang et al.

(10) Patent No.: US 12,589,760 B2
(45) Date of Patent: Mar. 31, 2026

(54) METHOD FOR CONTROLLING RANGE EXTENDER, AND RELATED DEVICE

(71) Applicant: BEIJING CO WHEELS TECHNOLOGY CO., LTD., Beijing (CN)

(72) Inventors: Hongyang Zhang, Beijing (CN); Yong Zhu, Beijing (CN); Wenyu Cao, Beijing (CN); Fei Hua, Beijing (CN); Hao Wang, Beijing (CN); Yue Meng, Beijing (CN); Yunpeng Ning, Beijing (CN)

(73) Assignee: BEIJING CO WHEELS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/879,137

(22) PCT Filed: Jun. 21, 2023

(86) PCT No.: PCT/CN2023/101854

§ 371 (c)(1),
(2) Date: Dec. 26, 2024

(87) PCT Pub. No.: WO2024/001919

PCT Pub. Date: Jan. 4, 2024

(65) Prior Publication Data

US 2025/0381968 A1 Dec. 18, 2025

(30) Foreign Application Priority Data

Jun. 28, 2022 (CN) .......................... 202210751932.4

(51) Int. Cl.
B60W 50/06 (2006.01)
B60W 50/00 (2006.01)
G06F 17/14 (2006.01)

(52) U.S. Cl.
CPC ........... B60W 50/06 (2013.01); G06F 17/142 (2013.01); B60W 2050/0013 (2013.01); B60W 2050/0057 (2013.01)

(58) Field of Classification Search
CPC ......... B60W 50/06; B60W 2050/0013; B60W 2050/0057; B60W 20/17; B60L 50/62; G06F 17/142
See application file for complete search history.

(56) References Cited

U.S. PATENT DOCUMENTS

| | | | | |
|---|---|---|---|---|
| 9,096,133 | B2 * | 8/2015 | Kohler | B60L 50/16 |
| 10,570,872 | B2 * | 2/2020 | Miller | B60H 1/143 |

(Continued)

FOREIGN PATENT DOCUMENTS

| | | |
|---|---|---|
| CN | 105438169 | 3/2016 |
| CN | 106828128 | 6/2017 |

(Continued)

OTHER PUBLICATIONS

Wipo, International Search Report and Written Opinion for PCT/CN2023/101854, Sep. 28, 2023.

(Continued)

*Primary Examiner* — Huan Le
(74) *Attorney, Agent, or Firm* — Hodgson Russ LLP

(57) ABSTRACT

A method for controlling a range extender includes obtaining a sound pressure level of environmental noises and obtaining a real-time fitted sound quality limit for a vehicle in a traveling procedure; processing the sound pressure level and the real-time fitted sound quality limit to obtain a sound pressure level margin, determining a working condition corresponding to a sound pressure level lower than or equal to the sound pressure level margin, and taking the working condition as a target calibration working condition; obtaining a respective corrected sound pressure level by perform- (Continued)

201
data obtaining module 202
sound pressure level margin determining module 203
corrected sound pressure level determining module 204
range extender working condition comparing and adjusting module ing correction through a correcting sound pressure function based on the sound pressure level and a respective sound pressure level of the range extender in each working condition; and comparing the real-time fitted sound quality limit corresponding to the target calibration working condition with a corresponding corrected sound pressure level, and adjusting the target calibration working condition based on the comparison.

20 Claims, 2 Drawing Sheets

(56)                References Cited

U.S. PATENT DOCUMENTS

| | | | | | |
|---|---|---|---|---|---|
| 11,479,128 | B2 * | 10/2022 | Li | ........................ | B60W 10/06 |
| 2019/0315333 | A1 * | 10/2019 | Nakazono | ............. | B60W 20/17 |

FOREIGN PATENT DOCUMENTS

| | | |
|---|---|---|
| CN | 109480859 | 3/2019 |
| CN | 110370942 | 10/2019 |
| CN | 111775724 | 10/2020 |
| CN | 114030462 | 2/2022 |
| DE | 102012201270 | 8/2013 |
| JP | 2010208496 | 9/2010 |
| JP | 2022080765 | 5/2022 |
| WO | 2022106861 | 5/2022 |

OTHER PUBLICATIONS

EPO, Extended European Search Report for EP Application No. 23830098.2, Sep. 15, 2025.

* cited by examiner

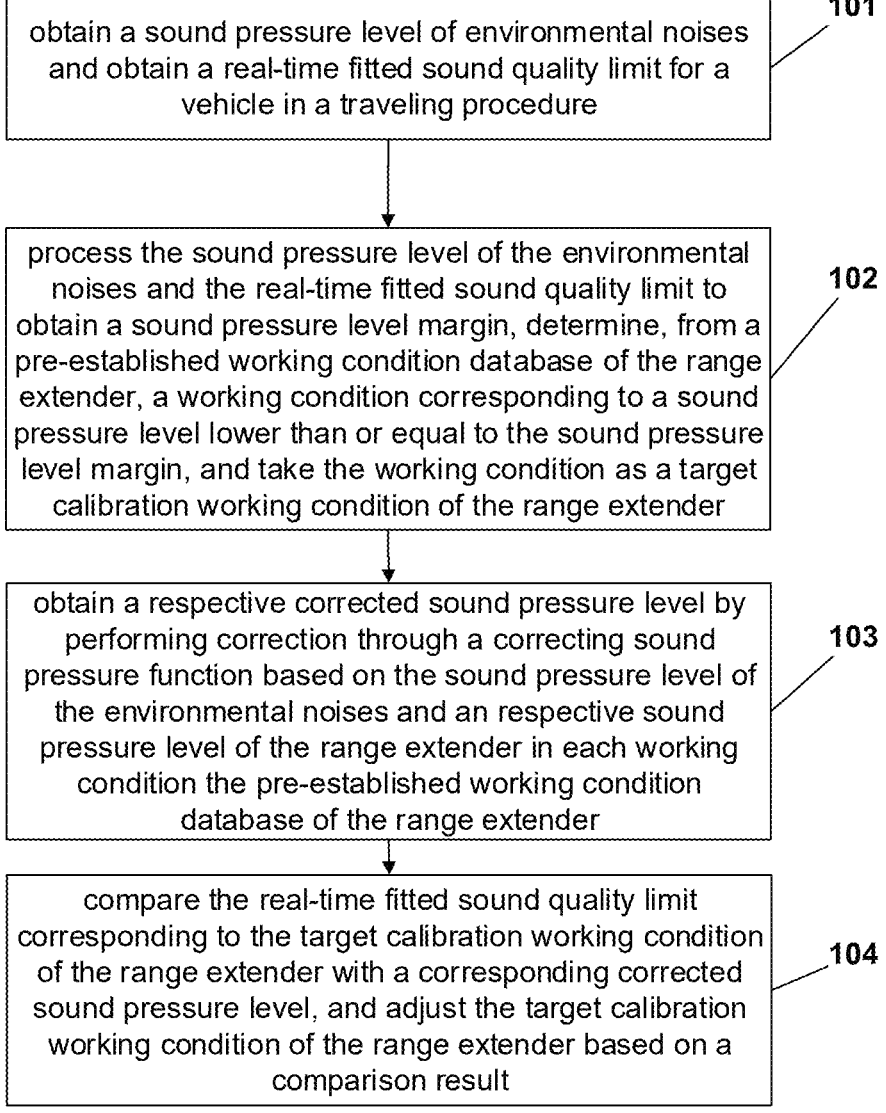

obtain a sound pressure level of environmental noises and obtain a real-time fitted sound quality limit for a vehicle in a traveling procedure

101 process the sound pressure level of the environmental noises and the real-time fitted sound quality limit to obtain a sound pressure level margin, determine, from a pre-established working condition database of the range extender, a working condition corresponding to a sound pressure level lower than or equal to the sound pressure level margin, and take the working condition as a target calibration working condition of the range extender

102 obtain a respective corrected sound pressure level by performing correction through a correcting sound pressure function based on the sound pressure level of the environmental noises and an respective sound pressure level of the range extender in each working condition the pre-established working condition database of the range extender

103 compare the real-time fitted sound quality limit corresponding to the target calibration working condition of the range extender with a corresponding corrected sound pressure level, and adjust the target calibration working condition of the range extender based on a comparison result

201 data obtaining module

202 sound pressure level margin
determining module

203 corrected sound pressure level
determining module

204 range extender working condition
comparing and adjusting module

301 processor

302 memory

305

303 input/output
interface

304 communication
interface

METHOD FOR CONTROLLING RANGE EXTENDER, AND RELATED DEVICE

CROSS-REFERENCE TO RELATED APPLICATION

This application is a national phase entry under 35 U.S.C. § 371 of International Application No. PCT/CN2023/101854, filed on Jun. 21, 2023, which claims priority to Chinese Patent Application No. 202210751932.4, filed on Jun. 28, 2022, the entire disclosures of which are hereby incorporated herein by reference.

TECHNICAL FIELD

The disclosure relates to a field of range extender control technologies, more particularly to a method and an apparatus for controlling a range extender, an electronic device, a vehicle, a non-transitory computer-readable storage medium, a computer program product and a computer program.

BACKGROUND

Most existing noise, vibration, harshness (NVH) solutions are off-line control methods. That is, in a traveling process of a vehicle, a range extender is controlled in accordance with an offline control solution to operate based on a certain working condition.

SUMMARY

A first aspect of embodiments of the disclosure provides a method for controlling a range extender, including:

obtaining a sound pressure level of environmental noises, and obtaining a real-time fitted sound quality limit for a vehicle in a traveling procedure of the vehicle;

obtaining a sound pressure level margin by processing the sound pressure level of the environmental noises and the real-time fitted sound quality limit, determining, from a pre-established working condition database of the range extender, a working condition corresponding to a sound pressure level lower than or equal to the sound pressure level margin, and taking the working condition as a target calibration working condition of the range extender;

obtaining a respective corrected sound pressure level by performing correction through a correcting sound pressure function based on the sound pressure level of the environmental noises and a respective sound pressure level of the range extender in each working condition in the pre-established working condition database of the range extender; and comparing the real-time fitted sound quality limit corresponding to the target calibration working condition of the range extender with a corresponding corrected sound pressure level, and adjusting the target calibration working condition of the range extender based on a comparison result.

A second aspect of embodiments of the disclosure provides an electronic device, including a memory, a processor, and a computer program stored in the memory and executable by the processor. The processor is configured to perform the method according to any one of embodiments in the first aspect when executing the computer program.

A third aspect of embodiments of the disclosure provides a non-transitory computer readable storage medium. The non-transitory computer readable storage medium has computer instructions stored thereon. The computer instructions are configured to enable the computer to perform the method according to any one of embodiments in the first aspect.

BRIEF DESCRIPTION OF THE DRAWINGS

In order to more clearly illustrate technical solutions in the disclosure or the related art, accompanying drawings needed to use in the description of embodiments or the related art will be introduced clearly below. Apparently, the accompanying drawings described below are only a part of embodiments of the disclosure. For the ordinary skilled in the art, other accompanying drawings may further be obtained based on these accompanying drawings without creative work.

FIG. 1 is a flowchart illustrating a method for controlling a range extender according to embodiments of the disclosure.

DETAILED DESCRIPTION

Figure 2:
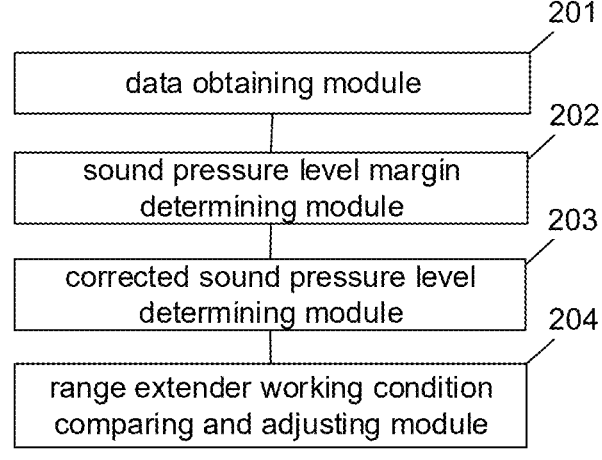
FIG. 2 is a block diagram illustrating an apparatus for controlling a range extender according to embodiments of the disclosure.

In order to understand the purpose, features and advantages of the disclosure more clearly, further description will be made below to the solution of the disclosure. It is noteworthy that, embodiments of the disclosure and features in embodiments may be combined with each other without conflict.

In following description, multiple specific details are set forth in order to fully understand the disclosure, but the disclosure may be implemented in other ways than those described herein. Apparently, embodiments in the specification are only part of embodiments of the disclosure, not all of them.

Most existing noise, vibration, harshness (NVH) solutions are off-line control methods. However, different environmental/ambient factors, such as a wind speed or a road surface, may cause different environmental/ambient noises during a traveling process of the vehicle, which causes a change in a sound pressure level in cockpit integrated by the environmental noises and engine noise. Therefore, a limit of the sound pressure level in cockpit defined in advance in a specified working condition is no longer effective, and it is possible that the sound pressure level in the cockpit exceeds the limit of the sound pressure level, thereby reducing the comfort. In addition, when there is a too large difference between the sound pressure level and the limit of the sound pressure level, a high efficiency region of an engine may not function properly and further improvement on traveling comfort and economy is limited. Meanwhile, due to inconsistency between vehicles of a same vehicle model, such as installation deviation and propagation path change, engines of different vehicle may generate different control deviations of noises in a same working condition.

Technical terms used in the solution of embodiments of the disclosure are explained as follows.

Range extender generally refers to a component of an electric vehicle that may provide an extra electric energy for increasing the traveling mileage of the electric vehicle. In a conventional sense, the range extender refers to a combination of an engine and a generator.

Sound pressure refers to a change in atmospheric pressure after being disturbed by a sound wave, that is, a residual pressure of the atmospheric pressure, which is equivalent to a pressure change caused by superimposing a sound wave disturbance on the atmospheric pressure.

Sound pressure level is a common unit that is used for representing a sound intensity in a logarithmic way.

Range extender MAP refers to an ignition control curve required by the engine in various working conditions, which is called a MAP diagram. The working state of the range extender is judged by a series of sensors, such as a range extender rotation speed sensor, an intake pipe vacuum sensor (engine load sensor), a throttle position sensor, or a crankshaft position sensor. A ignition advance angle required by the range extender in such working state is found from the MAP diagram, and the ignition is performed based on the requirement.

A four-cylinder engine is an engine composed of four cylinders. Inside of the four-cylinder engine, four identical single-cylinders are arranged on a same engine body to share a crankshaft to perform power output, a main function of which is to convert a chemical energy into a mechanical energy.

A rotational machinery order represents the number of times that an event occurs within a time that a rotational component rotates for one cycle, which is a response of vibration or/and noises caused by the rotation of the rotational component. The response of a certain order has a correspondence with a rotation speed and a rotation frequency. To be precise, the order is a multiple of the rotation speed or the rotation frequency.

Embodiments of the disclosure provide a method and an apparatus for controlling a range extender, an electronic device, a vehicle, a non-transitory computer-readable storage medium, a computer program product and a computer program, which may perform online control on the range extender, to maximize the economy of the vehicle while maintaining better comfort, and may avoid the control deviation caused by the vehicle inconsistency.

As illustrated in FIG. 1, the method in embodiments includes blocks 101 to 104.

At block 101, a sound pressure level of environmental noises is obtained, and a real-time fitted sound quality limit in a traveling procedure of a vehicle is obtained for the vehicle.

At this block, the sound pressure level of the environmental noises is obtained based on a spectrum of the environmental noises. In addition, different vehicle brands have their own standards for the real-time fitted sound quality limit. Therefore, a real-time fitted sound quality is calculated in accordance with a real-time traveling velocity of the vehicle based on the standard for the real-time fitted sound quality limit of the vehicle brand, which is a basis for realizing a personalized control of the vehicle and avoids the control deviation caused by the vehicle inconsistency.

At block 102, a sound pressure level margin is obtained by processing the sound pressure level of the environmental noises and the real-time fitted sound quality limit, a working condition corresponding to a sound pressure level lower than or equal to the sound pressure level margin is determined from a pre-established working condition database of the range extender, and the working condition is taken as a target calibration working condition of the range extender.

At this block, taking the sound pressure level margin as a standard, the working condition corresponding to the sound pressure level lower than or equal to the sound pressure level margin is searched for from the pre-established working condition database of the range extender, and the working condition is taken as the target calibration working condition to make preparations for a subsequent correction on a working condition.

At block 103, a respective corrected sound pressure level is obtained by performing correction through a correcting sound pressure function based on the sound pressure level of the environmental noises and a respective sound pressure level of the range extender in each working condition in the pre-established working condition database of the range extender.

At this block, since the real-time fitted sound quality limit is obtained in a way of superposing different frequency components, which may be too large, a sound pressure level obtained through the superposition may exceed the sound pressure level margin when the frequency components are same and phases are same, thereby causing that the sound pressure level exceeds the real-time fitted sound quality limit and reducing an NVH feeling. Therefore, there is a need to perform correction by the correcting sound pressure function based on the sound pressure level of the environmental noises and the respective sound pressure level of the range extender in each working condition in the pre-established working condition database of the range extender to obtain the respective corrected sound pressure level.

At block 104, the real-time fitted sound quality limit corresponding to the target calibration working condition of the range extender is compared with a corresponding corrected sound pressure level, and the target calibration working condition of the range extender is adjusted based on a comparison result.

At this block, the sound pressure level corresponding to the target calibration working condition is compared with a corresponding corrected sound pressure level. The range extender is controlled to operate based on the target calibration working condition when the sound pressure level corresponding to the target calibration working condition of the range extender is lower than or equal to the corresponding corrected sound pressure level.

When the sound pressure level corresponding to the target calibration working condition of the range extender is greater than the corrected sound pressure level, a power of the range extender is decreased based on a preset step size on the basis of the target calibration working condition of the range extender, and the correction processing is performed again to obtain a re-corrected sound pressure level. The re-corrected sound pressure level is compared with the real-time fitted sound quality limit. When a comparison result is that the real-time fitted sound quality limit is still greater than the re-corrected sound pressure level, the correction processing is performed repeatedly and circularly until the real-time fitted sound quality limit is lower than or equal to the re-corrected sound pressure level, and a corresponding target calibration working condition of the range extender is taken as a final target working condition. The range extender is controlled to operate based on the final target working condition. The online control of the range extender is realized. The operation adjustment on the range extender may constantly vary with a change in the environmental/ambient sound during the traveling of the vehicle. It is ensured that the state of the range extender may be maintained in such a way that the sound of the range extender does not disturb the user during the traveling of the vehicle, thereby maximizing the economy of the vehicle while maintaining the better comfort.

In some embodiments, at block 101, obtaining the sound pressure level of the environmental noises includes the following.

Real-time noise data of the vehicle in the traveling procedure is obtained, and conversion processing is performed on the real-time noise data to obtain a total noise spectrum.

A current working condition of the range extender in the traveling procedure of the vehicle is determined, a sound pressure level corresponding to the current working condition is determined from the pre-established working condition database of the range extender, the sound pressure level corresponding to the current working condition is taken as a current sound pressure level, and a current noise spectrum is obtained based on the current sound pressure level.

An environmental/ambient noise spectrum is obtained by subtracting the current noise spectrum from the total noise spectrum, and the sound pressure level of the environmental noises is obtained based on the environmental noise spectrum.

In the above solution, the real-time noise data of a corresponding working condition of the vehicle during the traveling of the vehicle may be obtained by means of a sound receiving device. The real-time noise data includes not only noises generated by the vehicle during the traveling procedure, but also the environmental noises. Since the real-time noise data is time-domain data (that is, real-time noise data) collected by the sound receiving device, there is a need to perform fast Fourier transform (FFT) processing on the real-time noise data, to convert the time-domain data into frequency-domain data to obtain the total noise spectrum.

Various parameter data of the range extender obtained during the traveling procedure of vehicle are collectively taken as the current working condition, and the sound pressure level (unit: decibel, DB) corresponding to the current working condition is searched for from the pre-established working condition database of the range extender. The found sound pressure level corresponding to the current working condition is taken as the current sound pressure level, and the sound pressure level of the environmental noises is obtained based on the environmental noise spectrum.

Since the total noise spectrum includes a noise spectrum of the range extender and the environmental noise spectrum in the current working condition, there is a need to directly subtract the noise spectrum of the range extender in the current working condition from the total noise spectrum to obtain the environmental noise spectrum. The sound pressure level of the environmental noises is obtained based on the environmental noise spectrum.

In some embodiments, obtaining the current noise spectrum based on the current sound pressure level includes the following.

Signal conversion is performed on the current sound pressure level to obtain time-domain waveform data.

The time-domain waveform data is expanded to a preset data processing window length, and delay processing is performed based on a preset initialization delay to form a time-domain reference sound wave.

The time-domain reference sound wave is processed by means of a least mean square (LMS) algorithm within one cycle time and a binary search algorithm to obtain a time-domain target sound wave corresponding to an optimal fitting result.

Fast Fourier transform processing is performed on the time-domain target sound wave to obtain the current noise spectrum.

In the above solution, the preset data processing window length may be set based on an actual situation, a detailed value of which may be modified. The time-domain waveform data is extended to the data processing window length, and the time-domain reference sound wave is formed by performing the delay processing based on the preset initialization delay. In this way, it is ensured that the formed time-domain reference sound wave may meet a processing requirement of the LMS algorithm.

Then, based on the number of cylinders corresponding to the range extender, for example, the four-cylinder engine, for the time-domain reference sound wave within one cycle time corresponding to four working cycles, the time-domain sound wave that is the optimal fitting result is searched for by means of the binary search algorithm, the found time-domain sound wave is taken as the time-domain target sound wave, and the current noise spectrum is obtained by performing the fast Fourier transform. In this way, the obtained current noise spectrum is more accurate.

In some embodiments, obtaining the sound pressure level of the environmental noises based on the environmental noise spectrum includes the following.

A sound pressure $P_{unfiltered}$ is obtained based on the environmental noise spectrum.

The sound pressure level $SPL_{amb}$ of the environmental noises is calculated based on a first sound pressure function $$SPL_{amb} = 10 \cdot \log 10 \left( \frac{\sum P_{unfiltered}^2}{P_{ref}^2} \right),$$

where $P_{ref}$ represents a reference sound pressure and is a constant value.

In the above solution, the sound pressure level corresponding to the environmental noises may be obtained accurately, and the unit of the sound pressure level corresponding to the environmental noises is DB, where $P_{ref}=2\times 10^{-5}$.

In some embodiments, obtaining the real-time fitted sound quality limit for the vehicle in the traveling procedure of block 101 includes:

obtaining a real-time traveling velocity of the vehicle in the traveling procedure, and determining the real-time fitted sound quality limit from the pre-established working condition database of the range extender based on the real-time traveling velocity.

In the above solution, the pre-established working condition database of the range extender includes respective fitted sound quality limits at different traveling velocities, and different vehicle brands have their own standards for the fitted sound quality limit. For example, a fitted sound quality limit of a certain vehicle is $SPL_{Limit}=-2.68 \cdot 10^{-4} \cdot VehSpd^2 + 0.21 \cdot VehSpd + 46.8$, where VehSpd represents the traveling velocity. The real-time traveling velocity of the vehicle in the traveling procedure is obtained, and the fitted sound quality limit corresponding to the real-time traveling velocity determined from the pre-established working condition database of the range extender is taken as the real-time fitted sound quality limit based on the real-time traveling velocity, thus reducing a space for data storage.

In some embodiments, obtaining the sound pressure level margin by processing the sound pressure level of the environmental noises and the real-time fitted sound quality limit of block 102 includes:

processing the sound pressure level $SPL_{amb}$ of the environmental noises and the real-time fitted sound quality limit $SPL_{Limit}$ by a sound pressure margin function

7

$$SPL_{marge} = 10 \cdot \log 10 (10^{\frac{SPL_{Limit}}{10}} - 10^{\frac{SPL_{amb}}{10}})$$

to obtain the sound pressure level margin $SPL_{marge}$.

In the above solution, the purpose of obtaining the sound pressure level margin is to take the sound pressure level margin as a standard to search from the pre-established working condition database of the range extender for a target calibration working condition. The working condition(s) corresponding to the sound pressure level lower than or equal to the sound pressure level margin are/is found, and the found working condition(s) are/is taken as the target calibration working condition(s) to make preparations for the correction on the working condition.

In some embodiments, the correcting sound pressure function is a correcting and fusing sound pressure function.

The block 103 includes:

when the range extender is a four-cylinder engine, based on a rotational machinery order being a second order, performing in-phase superposition on the sound pressure level $SPL_{amb}$ of the environmental noises and the respective sound pressure level $SPL_{eng}$ of the range extender in each working condition in the pre-established working condition database of the range extender through the correcting and fusing sound pressure function to obtain a respective corrected sound pressure level $SPL_{sum}$. The correcting and fusing sound pressure function is represented by:

$$SPL_{sum} = 10 \cdot \log 10 \cdot [10^{\frac{SPL_{amb}}{10}} + 10^{\frac{SPL_{eng}}{10}} + 2 \cdot \text{abs}(P_{eng2} \cdot P_{amb,eng2})],$$

where, abs represents a function for calculating an absolute value of data, $P_{eng2}$ represents a sound pressure of the working condition when the rotational machinery order of the range extender is the second order, and $P_{eng2}$ represents a sound pressure corresponding to the environmental noises.

In the above solution, when the range extender is the four-cylinder engine, the energy occupied by components when the rotational machinery order is the second order is maximum. Therefore, the in-phase superposition is performed based on the components of the second rotational machinery order, by the correcting and fusing sound pressure function. That is, the in-phase superposition is performed on the sound pressure level of the environmental noises and the respective sound pressure level of the range extender in the pre-established working condition database of the range extender to obtain the respective corrected sound pressure level.

In some embodiments, the block 104 include the following.

In response to determining that the real-time fitted sound quality limit corresponding to the target calibration working condition of the range extender is lower than or equal to a corresponding corrected sound pressure level, the range extender is controlled to operate based on the target calibration working condition.

In response to determining that the real-time fitted sound quality limit corresponding to the target calibration working condition of the range extender is greater than a corresponding corrected sound pressure level, a power of the range extender corresponding to the target calibration working condition of the range extender is decreased based on a preset step size to obtain a processed real-time fitted sound quality limit of a target calibration working condition of the range extender subjected to the decrease of the power.

A re-corrected sound pressure level is obtained by performing correction processing on the sound pressure level of the environmental noises and the processed real-time fitted sound quality limit of the target calibration working condition of the range extender subjected to the decrease of the power, and the comparison result is obtained by comparing the re-corrected sound pressure level with the processed real-time fitted sound quality limit of the target calibration working condition of the range extender subjected to the decrease of the power.

In response to determining that the comparison result is that the re-corrected sound pressure level is lower than or equal to the processed real-time fitted sound quality limit of the target calibration working condition of the range extender subjected to the decrease of the power, the target calibration working condition of the range extender subjected to the decrease of the power is taken as a final target working condition to control the range extender to operate based on the final target working condition.

In the above solution, when the real-time fitted sound quality limit corresponding to the target calibration working condition is lower than or equal to the corrected sound pressure level, the range extender is controlled to operate based on the target calibration working condition. When the real-time fitted sound quality limit is greater than the corrected sound pressure level, it means that such case may bring discomfort to the hearing sense of the user. In order to improve the comfort and to meet the traveling requirement simultaneously, there is a need to decrease the power of the range extender based on the preset step size on the basis of the target calibration working condition, and correction processing is performed to obtain a re-corrected sound pressure level, and then the obtained re-corrected sound pressure level is compared with the processed real-time fitted sound quality limit. In case that the comparison result is that the processed real-time fitted sound quality limit is still greater than the re-corrected sound pressure level, correction processing may be performed repeatedly and circularly until the processed real-time fitted sound quality limit is lower than or equal to a re-corrected sound pressure level. A target calibration working condition corresponding to the re-corrected sound pressure level is taken as the final target working condition. Parameters of the range extender are adjusted based on the target calibration working condition, and the online control of the range extender is realized based on the parameters. In this way, the operation adjustment of the range extender may constantly vary with the change of the environmental noises during the vehicle is traveling, it is ensured that the state of the range extender may be maintained in such a way that the sound of the range extender does not disturb the user during the traveling of the vehicle, thereby maximizing the economy of the vehicle while maintaining the better comfort.

In some embodiments, the working condition database of the range extender is established by:

in a quiet environment, determining respective spectrum data corresponding to each working condition based on an optimal fuel consumption line of a range extender MAP, obtaining respective time-domain noise data and a respective rotation speed of the range extender in each working condition, obtaining sound pressure level limits corresponding to the vehicle at different traveling velocities, and performing fitting processing on the sound pressure level limits corresponding to the vehicle at different traveling velocities to obtain a fitted sound quality limit;

calculating a respective rotation frequency of the range extender in each working condition through a frequency function based on the respective spectrum data corresponding to each working condition and the respective rotation speed of the range extender in each working condition;

calculating the respective sound pressure level of the range extender in each working condition through a second sound pressure level function based on the respective rotation frequency in each working condition; and integrating the respective sound pressure level of the range extender in each working condition with the fitted sound quality limit corresponding to the vehicle at different traveling velocities as the working condition database of the range extender.

In the above solution, the quiet environment within which the working condition database of the range extender is established refers to that there is no interference from other sound except an operation sound of the vehicle. The respective spectrum data corresponding to each working condition is determined based on the optimal fuel consumption line of the range extender MAP, and each working condition refers to the operation parameters of the range extender. The respective rotation speed of the range extender in each working condition is obtained. The respective noise in each working condition is recorded by the sound receiving device of the vehicle. The signal is converted into the time-domain noise data of the signal by an oscilloscope. Then, the sound pressure level limits of the vehicle at different traveling velocities are obtained. The fitting processing is performed based on the standard of the vehicle brand for the fitted sound quality limit based on the sound pressure level limits corresponding to the vehicle at different traveling velocities, to obtain the fitted sound quality limit as data of the working condition database of the range extender.

Then, the respective rotation frequency of the range extender in each working condition is calculated by the frequency function based on the respective frequency spectrum data corresponding to each working condition and the respective rotation speed of the range extender in each working condition. The respective sound pressure level of the range extender in each working condition is calculated by the second sound pressure level function based on the respective rotation frequency in each working condition. For example, the range extender is the four-cylinder engine, and noise energy of the four-cylinder engine is concentrated in first, second, $4^{th}$, $6^{th}$ and $8^{th}$ order, and rotation frequencies corresponding to respective orders may be calculated by the frequency function. Then a corresponding sound pressure is determined based on the rotation frequency, and a unit of the sound pressure is Pascal (pa). The respective sound pressure level of the range extender in each working condition is calculated based on the respective obtained sound pressure through the second sound pressure level function, and the respective pressure level of the range extender in each working condition is taken as the data of the working condition database of the range extender.

In some embodiments, performing the fitting processing on the sound pressure level limits corresponding to the vehicle at different traveling velocities to obtain the fitted sound quality limit includes:

obtaining a fitting function based on the sound pressure level limits corresponding to the vehicle at different traveling velocities, and fitting the traveling velocities of the vehicle in the traveling procedure by the fitting function to obtain the fitted sound quality limit.

In the above solution, the fitting function represents a standard of different vehicle brands for the fitted sound quality limit. For example, the standard of a certain vehicle for the fitted sound quality limit of the vehicle:

$$SPL_{Limit} = -2.68 \cdot 10^{-4} \cdot VehSpd^2 + 0.21 \cdot VehSpd + 46.8,$$

where VehSpd represents the traveling velocity, and the fitted sound quality limit is obtained by the fitting function, which reduces the space for data storage.

In some embodiments, calculating the respective rotation frequency of the range extender in each working condition through the frequency function based on the respective spectrum data corresponding to each working condition and the respective rotation speed of the range extender in each working condition includes:

determining the rotational machinery order n in which the noise energy of the range extender is concentrated in each working condition;

obtaining the respective rotation speed $r_{eng}$ of the range extender in each working condition; and calculating the respective rotation frequency Fn of the range extender in each working condition based on the frequency function $$F_n = \frac{r_{eng}}{60} \cdot n.$$

In the above solution, for example, the range extender is the four-cylinder engine, and the noise energy of the four-cylinder engine is concentrated in the $1^{st}$, $2^{nd}$, $4^{th}$, $6^{th}$ and $8^{th}$ order. Therefore, the respective rotation frequency Fn corresponding to each order may be calculated by the above frequency function.

In some embodiments, calculating the respective sound pressure level of the range extender in each working condition through the second sound pressure level function based on the respective rotation frequency in each working condition includes:

determining a respective sound pressure $P_{filtered}$ based on the respective rotation frequency Fn in each working condition; and calculating the respective sound pressure level $SPL_{eng}$ of the range extender in each working condition through the second sound pressure level function $$SPL_{eng} = 10 \cdot \log 10 \left( \frac{\sum P_{filtered}^2}{P_{ref}^2} \right),$$

where $P_{ref}$ represents the reference sound pressure and is a constant value.

In the above solution, the sound pressure levels of the range extender in different working conditions may be obtained accurately, and the unit of the sound pressure levels in the working conditions is DB, which is convenient to search for the corresponding sound pressure level directly based on the parameters of the working condition, without a complicated calculation process.

It is noteworthy that, the method of embodiments of the disclosure may be executed by a single device, such as a computer or a server. The method of embodiments may also be applied to a distributed scene, which is completed by multiple devices cooperating with each other. In such distributed scene, one of the multiple devices may only perform one or more steps in the method according to embodiments of the disclosure, and the multiple devices may interact with each other to complete the method.

It is noteworthy that, some embodiments of the disclosure have been described above. Other embodiments are within the scope of the appended claims. In some cases, the actions or steps recited in the claims may be performed in a sequence different from that in the above embodiments and may still achieve a desired result. In addition, a procedure depicted in the accompanying drawings does not necessarily require a specific sequence illustrated or a sequential order to achieve the desired result. In some embodiments, multi-tasking and parallel processing are also possible or may be advantageous.

Based on a same concept, corresponding to the method of any of the above embodiments, the disclosure also provides an apparatus for controlling a range extender.

As illustrated in FIG. 2, the apparatus for controlling the range extender includes a data obtaining module 201, a sound pressure level margin determining module 202, a corrected sound pressure level determining module 203, and a range extender working condition comparing and adjusting module 204.

The data obtaining module 201 is configured to obtain a sound pressure level of environmental noises and to obtain a real-time fitted sound quality limit for a vehicle in a traveling procedure of the vehicle.

The sound pressure level margin determining module 202 is configured to obtain the sound pressure level margin by processing the sound pressure level of the environmental noises and the real-time fitted sound quality limit, determine, from a pre-established working condition database of the range extender, a working condition corresponding to a sound pressure level lower than or equal to the sound pressure level margin, and take the working condition as a target calibration working condition of the range extender.

The corrected sound pressure level determining module 203 is configured to obtain a respective corrected sound pressure level by performing correction through a correcting sound pressure function based on the sound pressure level of the environmental noises and a respective sound pressure level of the range extender in each working condition in the pre-established working condition database of the range extender.

The range extender working condition comparing and adjusting module 204 is configured to compare the real-time fitted sound quality limit corresponding to the target calibration working condition of the range extender with a corresponding corrected sound pressure level, and adjust the target calibration working condition of the range extender based on a comparison result.

In some embodiments, the data obtaining module 201 includes a total noise spectrum obtaining unit, a current noise spectrum obtaining unit, and an environmental noise spectrum obtaining unit.

The total noise spectrum obtaining unit is configured obtain real-time noise data of the vehicle in the traveling procedure, and perform conversion processing on the real-time noise data to obtain a total noise spectrum.

The current noise spectrum obtaining unit is configured to determine a current working condition of the range extender in the traveling procedure of the vehicle, determine a sound pressure level corresponding to the current working condition from the pre-established working condition database of the range extender, take the sound pressure level corresponding to the current working condition as a current sound pressure level, and obtain the current noise spectrum based on the current sound pressure level.

The environmental noise spectrum obtaining unit is configured to obtain the environmental noise spectrum by subtracting the current noise spectrum from the total noise spectrum, and to obtain the sound pressure level of the environmental noises based on the environmental noise spectrum.

In some embodiments, the current noise spectrum obtaining unit is configured to:

perform signal conversion on the current sound pressure level to obtain time-domain waveform data;

expand the time-domain waveform data to a preset data processing window length, and perform delay processing based on a preset initialization delay to form a time-domain reference sound wave;

process the time-domain reference sound wave by utilizing a least mean square algorithm within one cycle time and a binary search algorithm to obtain a time-domain target sound wave corresponding to an optimal fitting result; and perform fast Fourier transform processing on the time-domain target sound wave to obtain the current noise spectrum.

In some embodiments, the environmental noise spectrum obtaining unit is configured to:

obtain a corresponding sound pressure $P_{unfiltered}$ based on the environmental noise spectrum; and calculate the sound pressure level $SPL_{amb}$ of the environmental noises based on a first sound pressure function $$SPL_{amb} = 10 \cdot \log 10 \left( \frac{\sum_i P_{unfiltered}^2}{P_{ref}^2} \right),$$

where $P_{ref}$ represents a reference sound pressure and is a constant value.

In some embodiments, the data obtaining module 201 is further configured to:

obtain a real-time traveling velocity of the vehicle in the traveling procedure, and determine the real-time fitted sound quality limit from the pre-established working condition database of the range extender based on the real-time traveling velocity.

In some embodiments, the sound pressure level margin determining module 202 is further configured to:

process the sound pressure level $SPL_{amb}$ of the environmental noises and the real-time fitted sound quality limit $SPL_{Limit}$ by a sound pressure margin function $$SPL_{marge} = 10 \cdot \log 10 \left( 10^{\frac{SPL_{Limit}}{10}} - 10^{\frac{SPL_{amb}}{10}} \right)$$

to obtain the sound pressure level margin $SPL_{marge}$.

In some embodiments, the correcting sound pressure function is a correcting and fusing sound pressure function.

The corrected sound pressure level determining module 203 is further configured to:

when the range extender is a four-cylinder machine, based on a rotational machinery order being a second order, perform in-phase superposition on the sound pressure level $SPL_{amb}$ of the environmental noises and the respective sound pressure level $SPL_{eng}$ of the range extender in each working condition in the pre-established working condition database of the range extender through the correcting and fusing sound pressure function to obtain the respective corrected sound pressure level $SPL_{sum}$, in which the correcting and fusing sound pressure function is represented by $$SPL_{sum} = 10 \cdot \log 10 \cdot \left[10^{\frac{SPL_{amb}}{10}} + 10^{\frac{SPL_{eng}}{10}} + 2 \cdot \text{abs}(P_{eng2} \cdot P_{amb,eng2})\right],$$

where, abs represents a function for calculating an absolute value of data, $P_{eng2}$ represents a sound pressure of the working condition when the rotational machinery order of the range extender is the second order, and $P_{eng2}$ represents a sound pressure corresponding to the environmental noises.

In some embodiments, the range extender working condition comparing and adjusting module 204 is further configured to:

in response to determining that the real-time fitted sound quality limit corresponding to the target calibration working condition of the range extender is lower than or equal to the corresponding corrected sound pressure level, control the range extender to operate based on the target calibration working condition;

in response to determining that the real-time fitted sound quality limit corresponding to the target calibration working condition of the range extender is greater than the corresponding corrected sound pressure level, decrease a power of the range extender corresponding to the target calibration working condition of the range extender based on a preset step size to obtain a processed real-time fitted sound quality limit of the target calibration working condition of the range extender subjected to a decrease of the power;

obtain a re-corrected sound pressure level by performing correction processing on the sound pressure level of the environmental noises and the processed real-time fitted sound quality limit of the target calibration working condition of the range extender subjected to the decrease of the power, and obtain the comparison result by comparing the re-corrected sound pressure level with the processed real-time fitted sound quality limit of the target calibration working condition of the range extender subjected to the decrease of the power; and in response to determining that the comparison result is that the re-corrected sound pressure level is lower than or equal to the processed real-time fitted sound quality limit of the target calibration working condition of the range extender subjected to the decrease the power, take the target calibration working condition of the range extender subjected to the decrease of the power as a final target working condition to control the range extender to operate based on the final target working condition.

In some embodiments, the apparatus for controlling the range extender also includes a range extender working condition database establishing module including a fitting processing unit, a rotation frequency obtaining unit, a sound pressure level obtaining unit, and a database integrating unit.

The fitting processing unit is configured to, in a quiet environment, determine respective spectrum data corresponding to each working condition based on an optimal fuel consumption line of a range extender MAP, obtain time-domain noise data of the range extender in each working condition and a respective rotation speed of the range extender in each working condition, obtain sound pressure level limits corresponding to the vehicle at different traveling velocities, and perform fitting processing on the sound pressure level limits corresponding to the vehicle at different traveling velocities to obtain a fitted sound quality limit.

The rotation frequency obtaining unit is configured to calculate a respective rotation frequency of the range extender in each working condition through a frequency function based on the respective spectrum data corresponding to each working condition and the respective rotation speed of the range extender in each working condition.

The sound pressure level obtaining unit is configured to calculate the respective sound pressure level of the range extender in each working condition through a second sound pressure level function based on the respective rotation frequency in each working condition.

The database integrating unit is configured to integrate the respective sound pressure level of the range extender in each working condition with the fitted sound quality limit corresponding to the vehicle at different traveling velocities as the working condition database of the range extender.

In some embodiments, the fitting processing unit is further configured to:

obtain a fitting function based on the sound pressure level limits corresponding to the vehicle at different traveling velocities, and fit the traveling velocities of the vehicle in the traveling procedure by the fitting function to obtain the fitted sound quality limit.

In some embodiments, the rotation frequency obtaining unit is further configured to:

determine the rotational machinery order n in which the noise energy of the range extender is concentrated in each working condition;

obtain the respective rotation speed $r_{eng}$ of the range extender in each working condition; and calculate the respective rotation frequency Fn of the range extender in each working condition based on the frequency function $$F_n = \frac{r_{eng}}{60} \cdot n.$$

In some embodiments, the sound pressure level obtaining unit is further configured to:

determine a respective sound pressure $P_{filtered}$ based on the respective rotation frequency Fn in each working condition; and calculate the respective sound pressure level $SPL_{eng}$ of the range extender in each working condition through the second sound pressure level function $$SPL_{eng} = 10 \cdot \log 10 \left(\frac{\sum P_{filtered}^2}{P_{ref}^2}\right),$$

where $P_{ref}$ represents the reference sound pressure and is a constant value.

For the convenience of description, when the above apparatus is described, the above apparatus is divided into various modules based on functions for description respectively. Certainly, the function of each module may be realized in a same or multiple software and/or hardware when the embodiments of the disclosure are implemented.

The apparatus in above embodiments is configured to implement the corresponding method for controlling the range extender in any of the above embodiments, and has the beneficial effects corresponding to the method embodiments, which will not be elaborated herein.

Based on the same concept and corresponding to any of the above embodiments, embodiments of the disclosure also provide an electronic device, including a memory, a processor, and a computer program stored in the memory and executable on the processor. The processor is configured to perform the method for controlling the range extender according to any of the above embodiments when executing the program.

Figure 3:
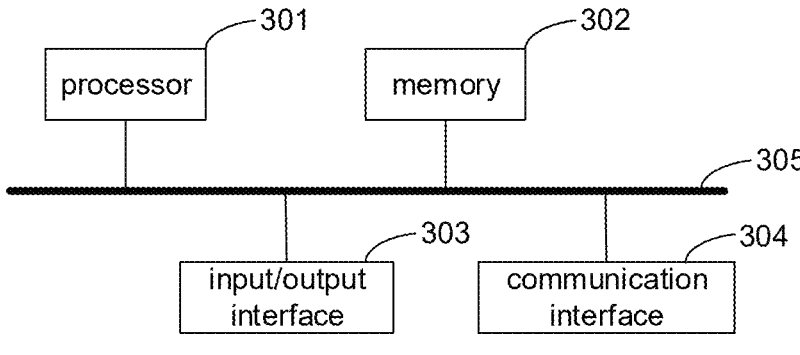
FIG. 3 is a schematic diagram illustrating an electronic device according to embodiments of the disclosure.

FIG. 3 is a structural schematic diagram illustrating a detailed electronic device according to the embodiment. The electronic device may include a processor 301, a memory 302, an input/output interface 303, a communication interface 304 and a bus 305. The processor 301, the memory 302, the input/output interface 303 and the communication interface 304 are connected to each other via the bus 305 inside the electronic device.

The processor 301 may be realized in a way of a general central processing unit (CPU), a microprocessor, an application specific integrated circuit (ASIC), or one or more integrated circuits, and is configured to execute related programs to realize the technical solution provided by embodiments of the specification.

The memory 302 may be realized in a form of a read only memory (ROM), a random access memory (RAM), a static storage device, a dynamic storage device, etc. The memory 302 may store an operating system and other application programs. When the technical solution provided by embodiments of this specification is realized by software or firmware, the relevant program codes are saved in the memory 302, and called and executed by the processor 301.

The input/output interface 303 is configured to connect input/output modules to realize information input and output. The input/output modules may be taken as components configured in a device (not illustrated in the figure), or may also be externally connected to the device to provide a corresponding function. The input device may include a keyboard, a mice, a touch screen, a microphone, various sensors, etc. The output device may include a display, a speaker, a vibrator, am indicator light, etc.

The communication interface 304 is configured to connect a communication module (not illustrated in the figure) to realize communication interaction between the device and other devices. The communication module may communicate in a wired mean (such as a USB, a network cable, etc.), or a wireless mean (such as a mobile network, a WIFI, a Bluetooth, etc.).

The bus 305 includes a path to transmit information between various components (such as the processor 301, the memory 302, the input/output interface 303 and the communication interface 304) of the device.

It should be noted that, although the above device merely illustrates the processor 301, the memory 302, the input/output interface 303, the communication interface 304 and the bus 305, the device may also include other components necessary for normal operation in a detailed implementation process. In addition, it may be understood by those skilled in the art that the above device may also include merely the components necessary to realize the embodiments of this specification, but not all the components illustrated in the figure.

The electronic device of the above embodiment is configured to realize the corresponding method for controlling the range extender in any one of the above embodiments, and has a beneficial effect corresponding to the method embodiment, which is not elaborated here.

Based on the same inventive concept, this embodiment provides a vehicle including the electronic device described in the above embodiment. The vehicle has a same technical effect as the method implemented on the electronic device, which is not elaborated here.

Based on the same concept, corresponding to the method according to any one of above embodiments, embodiments of the disclosure also provide a non-transitory computer readable storage medium. The non-transitory computer readable storage medium is configured to store computer instructions. The computer instructions are configured to cause the computer to perform the method for controlling the range extender according to any of the above embodiments.

The computer-readable storage medium in embodiments includes a permanent and non-permanent, and removable and non-removable medium, and information storage may be realized by any method or technology. Information may be computer-readable instructions, data structures, modules of programs or other data. An example of the storage medium of the computer include, but not limited to, a phase change memory (PRAM), a static random access memory (SRAM), a dynamic random access memory (DRAM), a random access memory (RAM) in other type, a read-only memory (ROM), an electrically erasable programmable read-only memory (EEPROM), a flash memory or other memory technologies, a read-only CD-ROM, a digital versatile disc (DVD) or other optical storage, a magnetic cassette, a magnetic tape magnetic disk storage or other magnetic storage device, or any other non-transmission medium, which may be configured to store information that may be accessed by the computing device.

The computer instructions stored in the storage medium of above embodiments are configured to cause the computer to perform the method for controlling the range extender according to any of above embodiments, and have the beneficial effect corresponding to method embodiment, which will not be elaborated herein.

Based on the same concept, in order to realize above embodiments, embodiments of the disclosure also provide a computer program product, including a computer program. The computer program is executed by a processor to cause the processor to perform the method for controlling the range extender according to any embodiment of the disclosure.

Based on the same concept, in order to realize above embodiments, embodiments of the disclosure also provide a computer program. The computer program includes computer program codes. When the computer program codes are running on the computer, the computer is caused to perform the method for controlling the range extender according to any embodiment of the disclosure.

It is noteworthy that, the above explanations of the method and apparatus embodiments are also applicable to the electronic device, the vehicle, the computer readable storage medium, the computer program product and the computer program in above embodiments, which is not elaborated herein.

With the method for controlling the range extender and related apparatus according to embodiments of the disclosure, the working condition corresponding to the sound pressure level lower than or equal to the sound pressure level margin is selected from the pre-established working condition database of the range extender, to realize a personalized control of the vehicle and avoid control deviation caused by vehicle inconsistency. The selected working condition is taken as the target calibration working condition of the range extender, the corrected sound pressure level is obtained by performing correction based on the obtained sound pressure level of the environmental noises and the respective sound pressure level of the range extender in each working condition in the pre-established working condition database of the range extender; and the real-time fitted sound quality limit corresponding to the target calibration working condition is compared with the corrected sound pressure level, and the target calibration working condition of the range extender is adjusted based on a comparison result, thereby realizing the on-line control of the range extender, and maximizing the economy of the vehicle while maintaining better comfort.

It is understandable by those skilled in the art that, the discussion of any of the above embodiments is merely illustrative, and not intended to imply that the scope of the disclosure (including the claims) is limited to these examples. Under the idea of the disclosure, the technical features in above embodiments or different embodiments may also be combined, the steps may be realized in any sequence, and there are other multiple variations in different aspects according to above embodiments of the disclosure, which are not provided in the details for the sake of brevity.

In addition, in order to simplify the explanation and discussion, and not to obscure embodiments of the disclosure, well-known power/ground connections with an integrated circuit (IC) chip and other components may or may not be illustrated in the provided accompanying drawings. In addition, the apparatus may be illustrated in a block diagram form to avoid embodiments of the disclosure difficult to understand. The following fact is taken into account, that is, details about the implementation of the apparatus in the block diagram form are highly dependent on a platform where embodiments of the disclosure will be implemented (i.e., these details should be fully within an understanding range of those skilled in the art). In the case where a specific detail (e.g., circuits) are set forth to describe exemplary embodiments of the disclosure, it is obvious to those skilled in the art that embodiments of the disclosure may be implemented without these specific details or with these specific details having changes. Therefore, these descriptions should be regarded as illustrative rather than restrictive.

Although the disclosure has been described in connection with specific embodiments thereof, multiple alternatives, modifications and variations of these embodiments may be obvious to those skilled in the art from the foregoing description. For example, other memory architectures (e.g., dynamic RAM(DRAM)) may employ the discussed embodiments.

Embodiments of the disclosure are intended to cover all such alternatives, modifications and variations that fall within a broad scope of the appended claims. Therefore, any omission, modification, equivalent substitution, improvement and the like made within the spirit and principle of embodiments of the disclosure should be included in the protection scope of the disclosure.

It is noteworthy that, in the description, relational terms such as "first", "second" and the like are merely used to distinguish one entity or operation from another entity or operation, and do not necessarily require or imply that there is any such actual relationship or sequence between these entities or operations. Moreover, the term "including" or any other variation thereof is intended to cover non-exclusive inclusion, such that a process, method, article or device including a series of elements includes not only those elements, but also other elements not explicitly listed or elements inherent to such process, method, article or including. Without further restrictions, an element defined by the phrase "including one . . . " does not exclude the existence of other identical elements in the process, method, article or device including the elements.

All embodiments of the disclosure may be executed alone or in combination with other embodiments, which are regarded as the protection scope of the disclosure.

The invention claimed is:

1. A method for controlling a range extender, comprising:
   obtaining a sound pressure level of environmental noises and obtaining a real-time fitted sound quality limit for a vehicle in a traveling procedure of the vehicle;
   processing the sound pressure level of the environmental noises and the real-time fitted sound quality limit to obtain a sound pressure level margin, determining, from a pre-established working condition database of the range extender, a working condition corresponding to a sound pressure level lower than or equal to the sound pressure level margin, and taking the working condition as a target calibration working condition of the range extender;
   obtaining a respective corrected sound pressure level by performing correction through a correcting sound pressure function based on the sound pressure level of the environmental noises and a respective sound pressure level of the range extender in each working condition in the pre-established working condition database of the range extender; and
   comparing the real-time fitted sound quality limit corresponding to the target calibration working condition of the range extender with a corresponding corrected sound pressure level, and adjusting the target calibration working condition of the range extender based on a comparison result.

2. The method of claim 1, wherein obtaining the sound pressure level of the environmental noises comprises:
   obtaining real-time noise data of the vehicle in the traveling procedure, and performing conversion processing on the real-time noise data to obtain a total noise spectrum;
   determining a current working condition of the range extender in the traveling procedure of the vehicle, determining a sound pressure level corresponding to the current working condition from the pre-established working condition database of the range extender, taking the sound pressure level corresponding to the current working condition as a current sound pressure level, and obtaining a current noise spectrum based on the current sound pressure level; and
   obtaining an environmental noise spectrum by subtracting the current noise spectrum from the total noise spectrum, and obtaining the sound pressure level of the environmental noises based on the environmental noise spectrum.

3. The method of claim 2, wherein obtaining the current noise spectrum based on the current sound pressure level comprises:
   performing signal conversion on the current sound pressure level to obtain time-domain waveform data;
   expanding the time-domain waveform data to a preset data processing window length, and performing delay processing based on a preset initialization delay to form a time-domain reference sound wave;

processing the time-domain reference sound wave by utilizing a least mean square algorithm within one cycle time and a binary search algorithm to obtain a time-domain target sound wave corresponding to an optimal fitting result; and performing fast Fourier transform processing on the time-domain target sound wave to obtain the current noise spectrum.

4. The method of claim 2, wherein obtaining the sound pressure level of the environmental noises based on the environmental noise spectrum comprises:

obtaining a sound pressure $P_{unfiltered}$ based on the environmental noise spectrum; and calculating the sound pressure level $SPL_{amb}$ of the environmental noises based on a first sound pressure function $$SPL_{amb} = 10 \cdot \log10\left(\frac{\sum P_{unfiltered}^2}{P_{ref}^2}\right),$$

where $P_{ref}$ represents a reference sound pressure and is a constant value.

5. The method of claim 4, wherein obtaining the sound pressure level margin by processing the sound pressure level of the environmental noises and the real-time fitted sound quality limit comprises:

processing the sound pressure level $SPL_{amb}$ of the environmental noises and the real-time fitted sound quality limit $SPL_{Limit}$ by a sound pressure margin function $$SPL_{marge} = 10 \cdot \log10\left(10^{\frac{SPL_{Limit}}{10}} - 10^{\frac{SPL_{amb}}{10}}\right)$$

to obtain the sound pressure level margin $SPL_{marge}$.

6. The method of claim 4, wherein the correcting sound pressure function is a correcting and fusing sound pressure function; and obtaining the respective corrected sound pressure level by performing correction through the correcting sound pressure function based on the sound pressure level of the environmental noises and the respective sound pressure level of the range extender in each working condition in the pre-established working condition database of the range extender comprises:

when the range extender is a four-cylinder engine, based on a rotational machinery order being a second order, performing in-phase superposition on the sound pressure level $SPL_{amb}$ of the environmental noises and the respective sound pressure level $SPL_{eng}$ of the range extender in each working condition in the pre-established working condition database of the range extender through the correcting and fusing sound pressure function to obtain the respective corrected sound pressure level $SPL_{sum}$, wherein the correcting and fusing sound pressure function is represented by $$SPL_{sum} = 10 \cdot \log10 \cdot \left[10^{\frac{SPL_{amb}}{10}} + 10^{\frac{SPL_{eng}}{10}} + 2 \cdot \text{abs}(P_{eng2} \cdot P_{amb,eng2})\right],$$

where, abs represents a function for calculating an absolute value of data, $P_{eng2}$ represents a sound pressure of the working condition when the rotational machinery order of the range extender is the second order, and $P_{amb,eng\,2}$ represents a sound pressure corresponding to the environmental noises.

7. The method of claim 1, wherein obtaining the real-time fitted sound quality limit for the vehicle in the traveling procedure comprises:

obtaining a real-time traveling velocity of the vehicle in the traveling procedure, and determining the real-time fitted sound quality limit from the pre-established working condition database of the range extender based on the real-time traveling velocity.

8. The method of any of claim 1, wherein comparing the real-time fitted sound quality limit corresponding to the target calibration working condition of the range extender with a corresponding corrected sound pressure level and adjusting the target calibration working condition of the range extender based on the comparison result comprises:

in response to determining that the real-time fitted sound quality limit corresponding to the target calibration working condition of the range extender is lower than or equal to the corresponding corrected sound pressure level, controlling the range extender to operate based on the target calibration working condition;

in response to determining that the real-time fitted sound quality limit corresponding to the target calibration working condition of the range extender is greater than the corresponding corrected sound pressure level, decreasing a power of the range extender corresponding to the target calibration working condition of the range extender based on a preset step size to obtain a processed real-time fitted sound quality limit of the target calibration working condition of the range extender subjected to a power decrease;

obtaining a re-corrected sound pressure level by performing correction processing on the sound pressure level of the environmental noises and the real-time fitted sound quality limit of the target calibration working condition of the range extender subjected to the power decrease, and obtaining the comparison result by comparing the re-corrected sound pressure level with the processed real-time fitted sound quality limit of the target calibration working condition of the range extender subjected to the power decrease; and in response to determining that the comparison result is that the re-corrected sound pressure level is lower than or equal to the processed real-time fitted sound quality limit of the target calibration working condition of the range extender subjected to the power decrease, taking the target calibration working condition of the range extender subjected to the power decrease as a final target working condition to control the range extender to operate based on the final target working condition.

9. The method of claim 1, wherein the working condition database of the range extender is established by:

determining respective spectrum data corresponding to each working condition based on an optimal fuel consumption line of a range extender MAP in a quiet environment, obtaining respective time-domain noise data of the range extender in each working condition and a respective rotation speed of the range extender in each working condition, obtaining sound pressure level limits corresponding to the vehicle at different traveling velocities, and performing fitting processing on the sound pressure level limits corresponding to the vehicle at different traveling velocities to obtain a fitted sound quality limit;

calculating a respective rotation frequency of the range extender in each working condition through a frequency function based on the respective spectrum data corresponding to each working condition and the respective rotation speed of the range extender in each working condition;

calculating the respective sound pressure level of the range extender in each working condition through a second sound pressure level function based on the respective rotation frequency in each working condition; and integrating the respective sound pressure level of the range extender in each working condition with the fitted sound quality limit corresponding to the vehicle at different traveling velocities as the working condition database of the range extender.

10. The method of claim 9, wherein performing fitting processing on the sound pressure level limits corresponding to the vehicle at different traveling velocities to obtain the fitted sound quality limit comprises:

obtaining a fitting function based on the sound pressure level limits corresponding to the vehicle at different traveling velocities, and fitting the traveling velocities of the vehicle in the traveling procedure by the fitting function to obtain the fitted sound quality limit.

11. The method of claim 9, wherein calculating the respective rotation frequency of the range extender in each working condition through the frequency function based on the respective spectrum data corresponding to each working condition and the respective rotation speed of the range extender in each working condition comprises:

determining the rotational machinery order n in which the noise energy of the range extender is concentrated in each working condition;

obtaining the respective rotation speed $r_{eng}$ of the range extender in each working condition; and calculating the respective rotation frequency Fn of the range extender in each working condition based on the frequency function $$F_n = \frac{r_{eng}}{60} \cdot n.$$

12. The method of claim 11, wherein calculating the respective sound pressure level of the range extender in each working condition through the second sound pressure level function based on the respective rotation frequency in each working condition comprises:

determining a respective sound pressure $P_{filtered}$ based on the respective rotation frequency Fn in each working condition; and calculating the respective sound pressure level $SPL_{eng}$ of the range extender in each working condition through the second sound pressure level function $$SPL_{eng} = 10 \cdot \log 10 \left( \frac{\sum P_{filtered}^2}{P_{ref}^2} \right),$$

where $P_{ref}$ represents the reference sound pressure and is a constant value.

13. An electronic device, comprising: a memory, a processor, and a computer program stored in the memory and executable by the processor, wherein the processor is configured to:

obtain a sound pressure level of environmental noises and obtain a real-time fitted sound quality limit for a vehicle in a traveling procedure of the vehicle;

process the sound pressure level of the environmental noises and the real-time fitted sound quality limit to obtain a sound pressure level margin, determine, from a pre-established working condition database of a range extender, a working condition corresponding to a sound pressure level lower than or equal to the sound pressure level margin, and take the working condition as a target calibration working condition of the range extender;

obtain a respective corrected sound pressure level by performing correction through a correcting sound pressure function based on the sound pressure level of the environmental noises and a respective sound pressure level of the range extender in each working condition in the pre-established working condition database of the range extender; and compare the real-time fitted sound quality limit corresponding to the target calibration working condition of the range extender with a corresponding corrected sound pressure level, and adjust the target calibration working condition of the range extender based on a comparison result.

14. A vehicle, comprising the electronic device according to claim 13.

15. The electronic device of claim 13, wherein the processor is further configured to:

obtain real-time noise data of the vehicle in the traveling procedure, and perform conversion processing on the real-time noise data to obtain a total noise spectrum;

determine a current working condition of the range extender in the traveling procedure of the vehicle, determine a sound pressure level corresponding to the current working condition from the pre-established working condition database of the range extender, take the sound pressure level corresponding to the current working condition as a current sound pressure level, and obtain a current noise spectrum based on the current sound pressure level; and obtain an environmental noise spectrum by subtracting the current noise spectrum from the total noise spectrum, and obtain the sound pressure level of the environmental noises based on the environmental noise spectrum.

16. The electronic device of claim 15, wherein the processor is further configured to:

perform signal conversion on the current sound pressure level to obtain time-domain waveform data;

expand the time-domain waveform data to a preset data processing window length, and perform delay processing based on a preset initialization delay to form a time-domain reference sound wave;

process the time-domain reference sound wave by utilizing a least mean square algorithm within one cycle time and a binary search algorithm to obtain a time-domain target sound wave corresponding to an optimal fitting result; and perform fast Fourier transform processing on the time-domain target sound wave to obtain the current noise spectrum.

17. The electronic device of claim 15, wherein the processor is further configured to:

obtain a sound pressure $P_{unfiltered}$ based on the environmental noise spectrum; and calculate the sound pressure level $SPL_{amb}$ of the environmental noises based on a first sound pressure function $$SPL_{amb} = 10 \cdot \log 10\left(\frac{\sum P_{unfiltered}^2}{P_{ref}^2}\right),$$

where $P_{ref}$ represents a reference sound pressure and is a constant value.

18. The electronic device of claim 17, wherein the processor is further configured to:

process the sound pressure level $SPL_{amb}$ of the environmental noises and the real-time fitted sound quality limit $SPL_{Limit}$ by a sound pressure margin function $$SPL_{marge} = 10 \cdot \log 10\left(10^{\frac{SPL_{Limit}}{10}} - 10^{\frac{SPL_{amb}}{10}}\right)$$

to obtain the sound pressure level margin $SPL_{marge}$.

19. The electronic device of claim 14, wherein the processor is further configured to:

obtain a real-time traveling velocity of the vehicle in the traveling procedure, and determine the real-time fitted sound quality limit from the pre-established working condition database of the range extender based on the real-time traveling velocity.

20. A non-transitory computer readable storage medium, having computer instructions stored thereon, which, when executed by a processor of a computer, the computer is caused to perform a method for controlling a range extender, the method comprising:

obtaining a sound pressure level of environmental noises and obtaining a real-time fitted sound quality limit for a vehicle in a traveling procedure of the vehicle;

processing the sound pressure level of the environmental noises and the real-time fitted sound quality limit to obtain a sound pressure level margin, determining, from a pre-established working condition database of the range extender, a working condition corresponding to a sound pressure level lower than or equal to the sound pressure level margin, and taking the working condition as a target calibration working condition of the range extender;

obtaining a respective corrected sound pressure level by performing correction through a correcting sound pressure function based on the sound pressure level of the environmental noises and a respective sound pressure level of the range extender in each working condition in the pre-established working condition database of the range extender; and comparing the real-time fitted sound quality limit corresponding to the target calibration working condition of the range extender with a corresponding corrected sound pressure level, and adjusting the target calibration working condition of the range extender based on a comparison result.

* * * * *